United States Patent
Yamamoto

(10) Patent No.: US 7,280,309 B2
(45) Date of Patent: Oct. 9, 2007

(54) ACCESS PERFORMANCE ADJUSTING METHOD AND STORAGE APPARATUS

(75) Inventor: Michio Yamamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/455,500

(22) Filed: Jun. 19, 2006

(65) Prior Publication Data
US 2006/0238913 A1    Oct. 26, 2006

Related U.S. Application Data

(62) Division of application No. 10/876,338, filed on Jun. 23, 2004, now Pat. No. 7,092,198.

(30) Foreign Application Priority Data
Feb. 26, 2004    (JP) .............................. 2004-051971

(51) Int. Cl.
*G11B 5/596* (2006.01)
(52) U.S. Cl. ................... 360/78.08; 360/78.04
(58) Field of Classification Search ............ 360/78.08, 360/78.04, 75, 77.02, 78.14; 711/112; 369/53.17
See application file for complete search history.

(56) References Cited

U.S. PATENT DOCUMENTS

| | | | | |
|---|---|---|---|---|
| 3,686,650 A | * | 8/1972 | Gleim et al. ............. | 360/78.14 |
| 5,212,798 A | * | 5/1993 | Kanda ........................ | 711/112 |
| 5,583,842 A | * | 12/1996 | Wilson et al. ........... | 369/53.17 |
| 5,835,299 A | | 11/1998 | Lee et al. ..................... | 360/76 |
| 5,940,237 A | | 8/1999 | Takagi ........................ | 360/75 |
| 6,201,655 B1 | | 3/2001 | Watanabe et al. ............. | 360/53 |
| 6,684,287 B1 | | 1/2004 | Ng ................ | 711/4 |
| 6,728,054 B2 | | 4/2004 | Chng et al. ................... | 360/63 |
| 2003/0202270 A1 | | 10/2003 | Ng et al. ..................... | 360/51 |

FOREIGN PATENT DOCUMENTS

| | | |
|---|---|---|
| JP | 2000-021106 | 1/2000 |
| JP | 2002-170348 | 6/2002 |

* cited by examiner

*Primary Examiner*—Fred F. Tzeng
(74) *Attorney, Agent, or Firm*—Greer, Burns & Crain, Ltd.

(57) ABSTRACT

An access performance adjusting method is adapted to a storage apparatus having a storage to prestore a skew quantity that is used to shift a data write starting position of each track of a recording medium depending on a head moving time required to move a head from one track to another track during a sequential access in which a plurality of tracks of the recording medium are accessed sequentially. The method includes measuring an apparatus performance with respect to a combination of the head and the recording medium, calculating a skew adjusting quantity with respect to the combination based on a reference apparatus performance and the measured apparatus performance, and adjusting the skew quantity read from the storage by the skew adjusting quantity and storing the adjusted skew quantity in the storage as an updated value of the skew quantity.

4 Claims, 7 Drawing Sheets

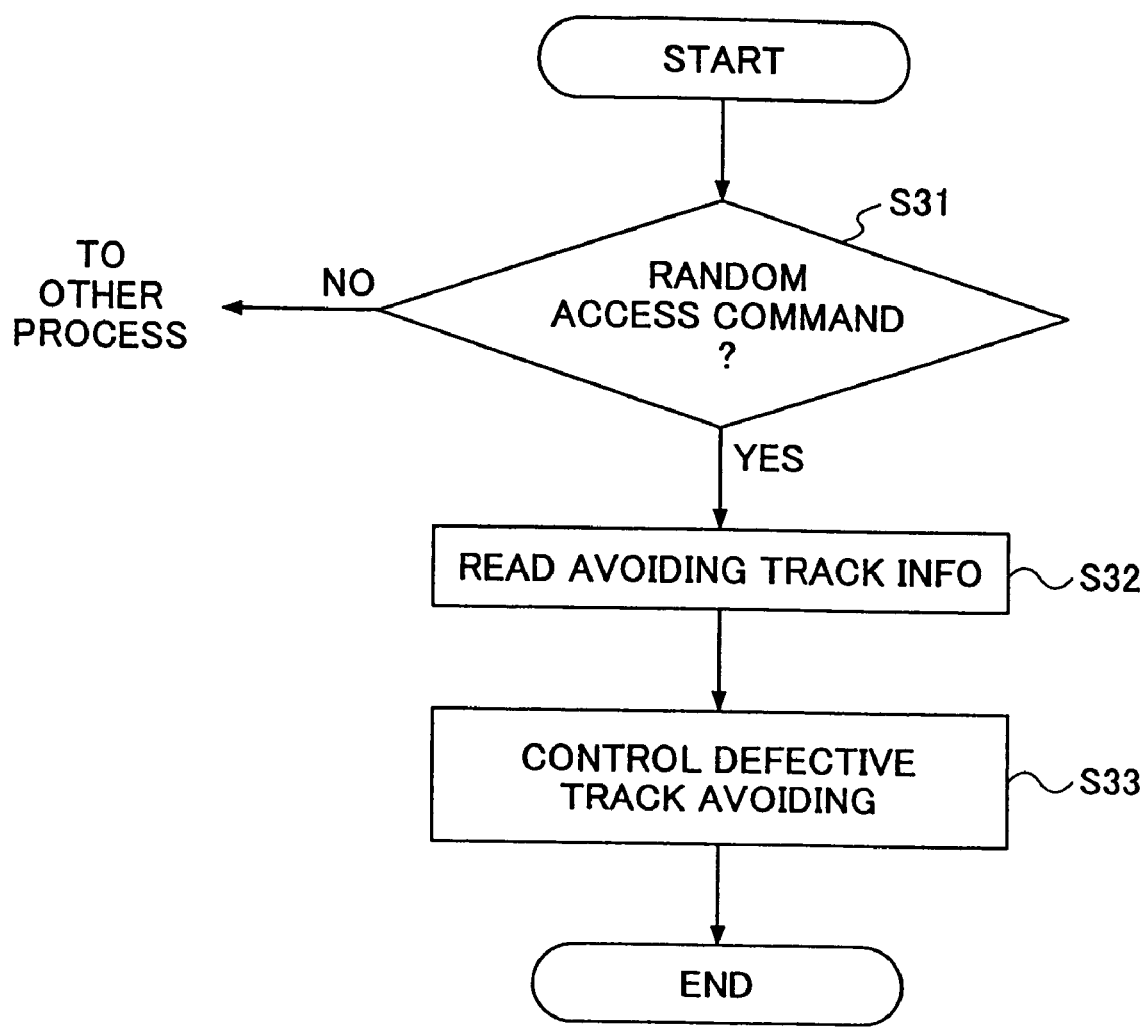

ACCESS PERFORMANCE ADJUSTING METHOD AND STORAGE APPARATUS

This is a divisional of application Ser. No. 10/876,338, filed Jun. 23, 2004 now U.S. Pat. No. 7,092,198.

BACKGROUND OF THE INVENTION

1. Field of the Invention

The present invention generally relates to access performance adjusting methods and storage apparatuses, and more particularly to an access performance adjusting method for adjusting a sequential access performance and a random access performance with respect to a recording medium, and to a storage apparatus which employs such an access performance adjusting method.

2. Description of the Related Art

In a magnetic disk apparatus which uses a magnetic disk having concentric tracks on which data are recorded, a sequential access is carried out to sequentially access a plurality of tracks. In order to carry out a data transfer at a high rate when carrying out the sequential access, the so-called "skew" technique is used. The skew technique shifts a data write starting position of each track depending on a time (hereinafter referred to as a head moving time) it takes to move a head from one track to another.

For example, suppose that the skew technique is not used and the data access starting positions of two mutually adjacent tracks are physically located along the same radial direction. In this case, when the access to the first track is completed and the head is to move to the adjacent second track, the head cannot move to the data access starting position of the second track in time, and it becomes necessary to wait for the magnetic disk to undergo one revolution. In other words, a wait time is generated. But when the skew technique is used, the data access starting position of the second track is shifted from the data access starting position of the first track in a circumferential direction by an amount corresponding to the head moving time, so as to reduce the wait time. When using the skew technique, the access performance is improved by reducing a data access delay caused by the wait time. Hence, an amount of skew, when converted in time, is set so that a minimum value becomes equal to the head moving time between two mutually adjacent tracks.

On the other hand, the magnetic disk apparatus uses a technique called "defective track avoiding process" to avoid defective tracks existing on the magnetic disk. When a defective track is detected on the magnetic disk, this defective track avoiding process avoids the defective track by preparing and using an alternate track on an inner peripheral side of the defective track, so as to maintain the total number of tracks constant among the magnetic disk apparatuses.

The recording density of the magnetic disk apparatus is increasing every year, and systems have been proposed to variably set the recording density, such as a Bit Per Inch (BPI) or a Track Per Inch (TPI) depending on the capabilities of the head and the magnetic disk. The yield of the magnetic disk apparatus can be improved by variably setting the BPI or TPI to an optimum value with respect to each combination of the head and the magnetic disk. However, when such a system is employed, the number of sectors within the track and the number of cylinders become different for each combination of the head and the magnetic disk and/or for each magnetic disk apparatus. The variable setting of the BPI or TPI is not made by the user, and is made when shipping the magnetic disk apparatus.

In the magnetic disk apparatus having the recording density, such as the BPI and TPI, that is variably set, the data transfer rate becomes different for each head and/or for each magnetic disk apparatus. For this reason, even among the magnetic disk apparatuses having the same storage capacity, there was a first problem in that the sequential access performance becomes greatly different among the magnetic disk apparatuses.

In addition, when the defective track avoiding process is carried out, the track that is used shifts towards the inner peripheral side of the magnetic disk. Consequently, if the defective tracks are frequently detected on a specific magnetic disk in the magnetic disk apparatus having a plurality of magnetic disks, a data storage location on the specific magnetic disk becomes greatly different from the corresponding data storage locations on the other magnetic disks within the magnetic disk apparatus. As a result, compared to the magnetic disks on which the defective tracks are not detected, the seek distance of the head with respect to the specific magnetic disk becomes longer. Accordingly, there was a second problem in that the random access performance with respect to an arbitrary track becomes greatly different among the magnetic disks within the magnetic disk apparatus depending on the number of defective tracks, and that the random access performance becomes greatly different among the magnetic disk apparatuses having the same storage capacity due to similar reasons.

Moreover, in the magnetic disk apparatus having the recording density, such as the BPI and TPI, that is variably set, the cylinder width at the time when one track is avoided becomes different for each head and/or for each magnetic disk apparatus, and the difference in the physical positions of the cylinders increases among the heads. Therefore, there was a third problem in that the random access performance becomes greatly different among the magnetic disk apparatuses, even among the magnetic disk apparatuses having the same storage capacity.

The first through third problems described above were not only generated in the magnetic disk apparatuses, but also in storage apparatuses having various kinds of recording media, such as optical disk apparatuses and magneto-optic disk apparatuses.

SUMMARY OF THE INVENTION

Accordingly, it is a general object of the present invention to provide a novel and useful access performance adjusting method and storage apparatus, in which the problems described above are suppressed.

Another and more specific object of the present invention is to provide an access performance adjusting method and a storage apparatus, which can solve at least one of the first through third problems described above, and realize a uniform access performance with respect to a recording medium.

Still another object of the present invention is to provide an access performance adjusting method for a storage apparatus having a storage to prestore a skew quantity that is used to shift a data write starting position of each track of a recording medium depending on a head moving time required to move a head from one track to another track during a sequential access in which a plurality of tracks of the recording medium are accessed sequentially, comprising the steps of (a) measuring an apparatus performance with respect to a combination of the head and the recording medium; (b) calculating a skew adjusting quantity with respect to the combination based on a reference apparatus performance and the measured apparatus performance; and (c) adjusting the skew quantity read from the storage by the skew adjusting quantity and storing the adjusted skew quantity in the storage as an updated value of the skew quantity. According to the access performance adjusting method of the present invention, it is possible to solve the first problem described above.

A further object of the present invention is to provide an access performance adjusting method comprising the steps of calculating a skew adjusting quantity with respect to a combination of a head and a recording medium, based on an actual data transfer rate with respect to the combination of the head and the recording medium and a reference data transfer rate; updating a prestored skew quantity that is used to shift a data write starting position of each track by adjusting the skew quantity by the skew adjusting quantity, depending on a head moving time required to move the head from one track to another track during a sequential access in which a plurality of tracks of the recording medium are accessed sequentially; and making a sequential access performance uniform among heads and/or among storage apparatuses provided with recording media. According to the access performance adjusting method of the present invention, it is possible to solve the first problem described above.

Another object of the present invention is to provide an access performance adjusting method for a storage apparatus having a recording medium with auxiliary tracks for avoiding defective tracks, comprising the steps of obtaining additional avoiding information for correcting a difference between cylinder positions of heads by inserting additional avoiding tracks with respect to a head located on an opposite side from the auxiliary tracks on the recording medium if the difference between the cylinder positions of the heads is greater than a tolerable value at predetermined intervals; and updating avoiding track information for accessing the auxiliary track by avoiding the defective tracks, stored in a storage, by use of the additional avoiding information. According to the access performance adjusting method of the present invention, it is also possible to solve the second and third problems described above.

Still another object of the present invention is to provide an access performance adjusting method comprising the steps of preparing at least one recording medium having auxiliary tracks for avoiding defective tracks; and storing a shift quantity between data write starting positions of one head with respect to the defective tracks and the auxiliary tracks, as a shift quantity between data write starting positions of all heads with respect to cylinders corresponding to the defective tracks, so as to make a random access performance uniform among heads. According to the access performance adjusting method of the present invention, it is also possible to solve the second and third problems described above.

A further object of the present invention is to provide a storage apparatus comprising a first storage configured to prestore a skew quantity that is used to shift a data write starting position of each track of a recording medium depending on a head moving time required to move a head from one track to another track during a sequential access in which a plurality of tracks of the recording medium are accessed sequentially; a measuring part configured to measure an apparatus performance with respect to a combination of the head and the recording medium; a calculating part configured to calculate a skew adjusting quantity with respect to the combination based on a reference apparatus performance and the measured apparatus performance; and an adjusting part configured to adjust the skew quantity read from the first storage by the skew adjusting quantity and storing the adjusted skew quantity in the first storage as an updated value of the skew quantity. According to the storage apparatus of the present invention, it is possible to solve the first problem described above.

Another object of the present invention is to provide a storage apparatus comprising a calculating part configured to calculate a skew adjusting quantity with respect to a combination of a head and a recording medium, based on an actual data transfer rate with respect to the combination of the head and the recording medium and a reference data transfer rate; and an updating part configured to update a prestored skew quantity that is used to shift a data write starting position of each track by adjusting the skew quantity by the skew adjusting quantity, depending on a head moving time required to move the head from one track to another track during a sequential access in which a plurality of tracks of the recording medium are accessed sequentially, so as to make a sequential access performance uniform among heads and/or among storage apparatuses provided with recording media. According to the storage apparatus of the present invention, it is possible to solve the first problem described above.

Still another object of the present invention is to provide a storage apparatus comprising at least one recording medium having auxiliary tracks for avoiding defective tracks; an obtaining part configured to obtain additional avoiding information for correcting a difference between cylinder positions of heads by inserting additional avoiding tracks with respect to a head located on an opposite side from the auxiliary tracks on the recording medium if the difference between the cylinder positions of the heads is greater than a tolerable value at predetermined intervals; a storage configured to store avoiding track information for accessing the auxiliary track by avoiding the defective tracks; and an updating part configured to update the avoiding track information stored in a storage, by use of the additional avoiding information. According to the storage apparatus of the present invention, it is also possible to solve the second and third problems described above.

A further object of the present invention is to provide a storage apparatus comprising at least one recording medium having auxiliary tracks for avoiding defective tracks; and a storage configured to store a shift quantity between data write starting positions of one head with respect to the defective tracks and the auxiliary tracks, as a shift quantity between data write starting positions of all heads with respect to cylinders corresponding to the defective tracks, so as to make a random access performance uniform among heads. According to the storage apparatus of the present invention, it is also possible to solve the second and third problems described above.

Other objects and further features of the present invention will be apparent from the following detailed description when read in conjunction with the accompanying drawings.

BRIEF DESCRIPTION OF THE DRAWINGS

FIG. 9 is a flow chart for explaining a random access operation.

DESCRIPTION OF THE PREFERRED EMBODIMENTS

Figure 1:
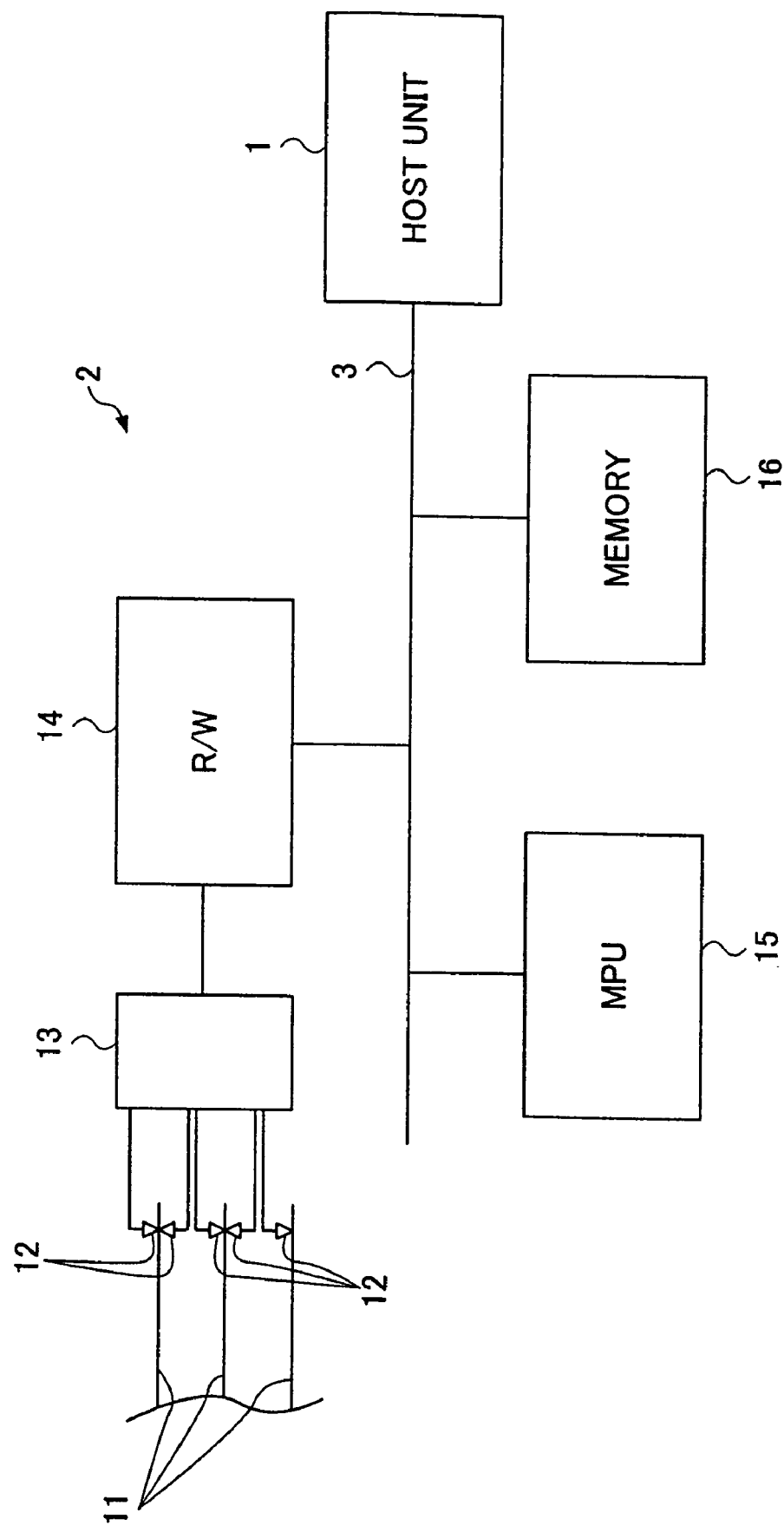
FIG. 1 is a system block diagram showing a part of a first embodiment of a storage apparatus according to the present invention.

A description will be given of embodiments of an access performance adjusting method according to the present invention and a storage apparatus according to the present invention, by referring to the drawings.

FIG. 1 is a system block diagram showing a part of a first embodiment of the storage apparatus according to the present invention. This first embodiment of the storage apparatus employs a first embodiment of the access performance adjusting method according to the present invention. In this embodiment, the present invention is applied to a magnetic disk apparatus.

In FIG. 1, a magnetic disk apparatus includes a host unit 1 and a disk drive part 2 which are connected via a bus 3. The disk drive part 2 includes a plurality of magnetic disks 11, a plurality of magnetic heads 12, an actuator part 13, a read/write (R/W) part 14, a MPU 15 and a memory 16. The host unit 1 controls the entire magnetic disk apparatus, and the MPU 15 controls the elements within the disk drive part 2.

The actuator part 13 has a known structure for controlling the position of each magnetic head 12 with respect to the corresponding magnetic disk 11. The R/W part 14 has a known structure for processing read data which are reproduced from the magnetic disk 11 by each of the magnetic heads 12 during a read operation, and for supplying write data which are to be recorded on the magnetic disk 11 to each of the magnetic heads 12 during a write operation. A read command from a host unit 1 is supplied to the MPU 15 via the bus 3, and the read data from the R/W part 14 are supplied to the host unit 1 via the bus 3 under the control of the MPU 15. A write command and the write data from the host unit 1 are supplied to the disk drive part 2 via the bus 3. The write command is supplied to the MPU 15, and the write data are supplied to the R/W part 14 and recorded on the magnetic disk 11 by the magnetic heads 12 under the control of the MPU 15. The memory 16 stores programs to be executed by the MPU 15, and various kinds of data including intermediate data of operations carried out by the MPU 15. The memory 16 also stores a skew quantity table (first embodiment), a defect avoiding table and the like which will be described later.

The basic structure of the magnetic disk apparatus is not limited to that shown in FIG. 1, and the magnetic disk apparatus may have any suitable basic structure as long as it is capable of carrying out a sequential access and a random access which will be described later.

In this embodiment, a skew adjusting quantity with respect to the combination of the magnetic head 12 and the magnetic disk 11 is obtained by calculation, based on an apparatus performance such as an actual data transfer rate, and a reference apparatus performance such as a reference data transfer rate, with respect to the combination of the magnetic head 12 and the magnetic disk 11. A skew quantity which is used to shift the data write starting position of each track depending on the head moving time that is required to move the magnetic head 12 from one track to another when carrying out the sequential access to sequentially access a plurality of tracks on the magnetic disk 11, is prestored in the memory 16. The skew quantity is updated to a value which is adjusted using the skew adjusting quantity. Hence, it is possible to make the sequential access performance uniform among the magnetic heads 12 and/or among the magnetic disk apparatuses having the magnetic disks 11.

Figure 2:
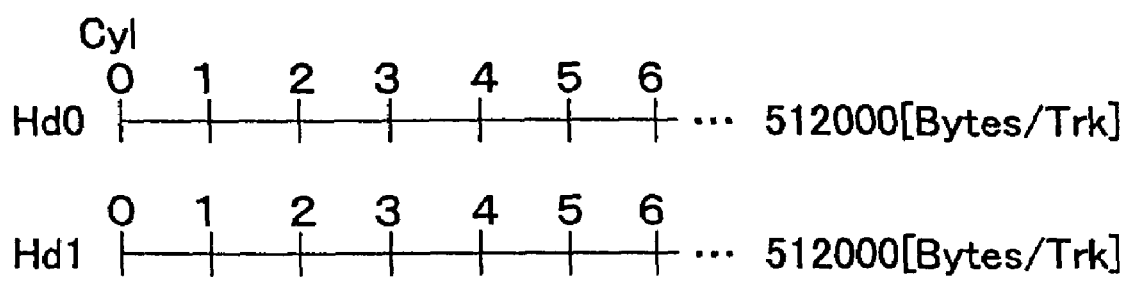
FIG. 2 is a diagram for explaining the operation of the first embodiment of the storage apparatus.
Figure 3:
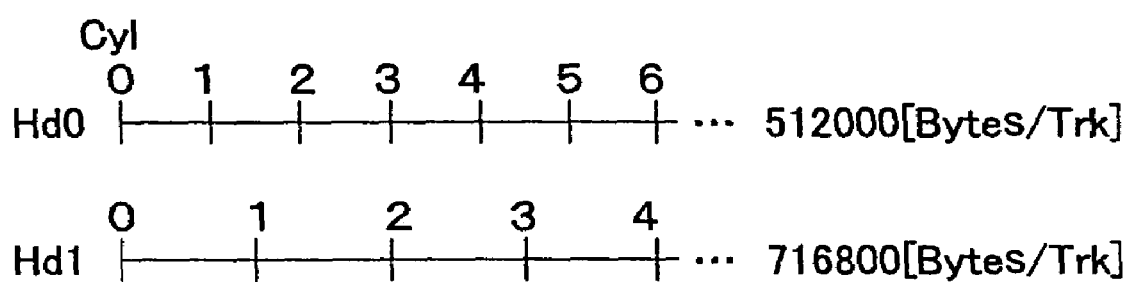
FIG. 3 is a diagram for explaining the operation of the first embodiment of the storage apparatus.

FIGS. 2 and 3 are diagrams for explaining the operation of this embodiment. FIG. 2 shows the relationship of the magnetic heads 12 and the cylinders of the magnetic disks 11 in the magnetic disk apparatus having the reference apparatus performance. FIG. 3 shows the relationship of the magnetic heads 12 and the cylinders (or tracks) of the magnetic disks 11 in the magnetic disk apparatus which is a target of the access performance adjustment. For the sake of convenience, it is assumed that the magnetic disks 11 rotate at a rotational speed of 10025 rpm, and a track capacity of the magnetic disk apparatus having the reference apparatus performance is 512000 bytes per track (Bytes/Trk). In FIGS. 2 and 3, "Cyl" indicates the cylinder number (number assigned to the cylinder), and Hd0 and Hd1 indicate head numbers assigned to the magnetic heads 12.

In the case of the sequential access in which the access to 7 cylinders Cyl10 through Cyl16 by the head number Hd0 and the access to 7 cylinders Cyl0 through Cyl6 by the header number Hd1 are made sequentially in FIG. 2, a reference data transfer rate RDTR can be described by the following formula (1), where ST1 indicates an amount of total skew (total skew quantity) amounting to 14 cylinders (tracks).

$$RDTR=[512000(\text{Bytes}/trk)\times14(trk)]/[\{60(\text{sec})/10025(\text{rpm})\}\times14(trk)+ST1] \quad (1)$$

Hence, if the total skew quantity ST1 is 0, the reference data transfer rate RDTR is 85.55 (Mbytes/sec).

In the case shown in FIG. 3, the rotational speed of the magnetic disk 11 is 10025 rpm, and the track capacity of the magnetic disk apparatus which is the target of the access performance adjustment is 512000 (Bytes/trk) for the head number Hd0 and is 716800 (Bytes/trk) for the head number Hd1. In other words, compared to the head number Hd0, the BPI of the head number Hd1 is variably set to be 1.5 times higher, and the TPI of the head number Hd1 is variably set to be 1.5 times lower. In the case of the sequential access in which the access to 7 cylinders Cyl10 through Cyl16 by the head number Hd0 and the access to 5 cylinders Cyl0 through Cyl4 by the header number Hd1 are made sequentially in FIG. 3, a data transfer rate DTR can be described by the following formula (2), where ST2 indicates an amount of total skew (total skew quantity) amounting to 12 cylinders (tracks).

$$DTR[\{512000(\text{Bytes}/trk)\times7(trk)\}+\{716800(\text{Bytes}/trk)\times5(trk)\}]/[\{60(\text{sec})/10025(\text{rpm})\}\times12(trk)+ST2] \quad (2)$$

Thus, if the total skew quantity ST2 is 0, the data transfer rate DTR is 99.80 (Mbytes/sec).

When the actually measured apparatus performance of the magnetic disk apparatus is less than or equal to the reference apparatus performance, the skew quantity is not adjusted. But when the actually measured apparatus performance exceeds the reference apparatus performance, the adjusting quantity is added to the skew quantity so as to adjust the skew quantity. In other words, in this embodiment, the skew quantity is adjusted using an adjusting quantity ADJ obtained from the following formula (3) and updated, if the data transfer rate DTR exceeds the reference data transfer rate RDTR. In the formula (3), DAT1 indicates a data access time with the reference apparatus performance, DAT2 indicates a data access time with the actually measured apparatus performance of the magnetic disk apparatus, CAP1 indicates a capacity with the reference apparatus performance, and CAP2 indicates a capacity with the actually measured apparatus performance of the magnetic disk apparatus.

$$ADJ=[(DAT1-DAT2) \times CAP2]/CAP1 \qquad (3)$$

Accordingly, in the case shown in FIG. 3, the adjusting quantity ADJ is 11.97 (msec)+(ST1−ST2), and the adjusting quantity ADJ is 11.97 (msec) if the total skew quantities ST1 and ST2 are 0. If the total skew quantity ST1 in the formula (2) is updated to ST1+ADJ, the data transfer rate DTR becomes 85.55 (Mbytes/sec) since ST1 is assumed to be 0, and the data transfer rate DTR becomes the same as the reference data transfer rate RDTR. As a result, the sequential access performance becomes uniform among the magnetic heads 12 and/or the magnetic disk apparatuses having the magnetic disks 11.

Figure 4:
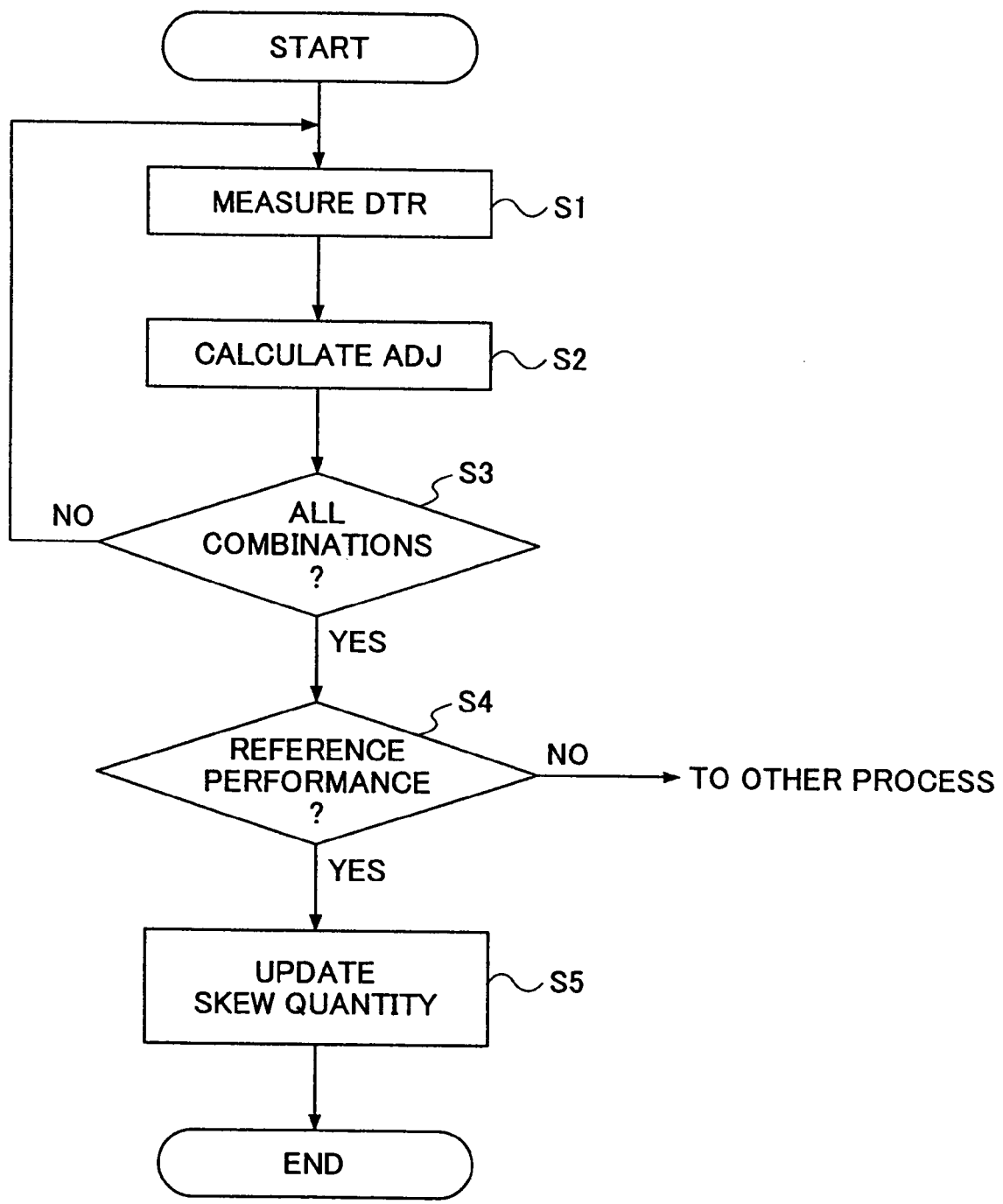
FIG. 4 is a flow chart for explaining the operation of the first embodiment of the storage apparatus.

FIG. 4 is a flow chart for explaining the operation of this embodiment. The process shown in FIG. 4 is carried out by the host unit 1 shown in FIG. 1 when shipping the magnetic disk apparatus.

In FIG. 4, a step S1 measures the data transfer rate DTR of the magnetic disk apparatus which is the target of the access performance adjustment and in which the relationship of the magnetic heads 12 and the cylinders of the magnetic disks 11 is as shown in FIG. 3, using the formula (2). A step S2 reads the reference data transfer rate RDTR from the memory 16 or a memory of the host unit 1, and calculates the adjusting quantity ADJ using the formula (3) if the data transfer rate DTR exceeds the reference data transfer rate RDTR. The reference data transfer rate RDTR is calculated using the formula (1), and is prestored in the memory 16 or the memory of the host unit 1. It is possible to store a plurality of kinds of reference data transfer rates RDTRs and to read the reference data transfer rate RDTR which is to be used as a reference in the magnetic disk apparatus which is the target of the access performance adjustment.

A step S3 decides whether or not the steps S1 and S2 are carried out with respect to all combinations of the magnetic heads 12 and the magnetic disks 11 within the magnetic disk apparatus. The process returns to the step S1 if the decision result in the step S3 is NO. If the decision result in the step S3 is YES, a step S4 decides whether or not the reference apparatus performance is satisfied by the adjustment of the data transfer rate DTR, that is, the apparatus performance. If the decision result in the step S4 is NO, the process advances to a next process which is not directly related to the subject matter of the present invention, and for example, a decision is made to determine whether or not to use the magnetic disk apparatus as an apparatus satisfying another reference apparatus performance. On the other hand, if the decision result in the step S4 is YES, a step S5 adjusts the skew quantity by adding the adjusting quantity ADJ to the skew quantity within the skew quantity table stored in the memory 16, updates the skew quantity within the skew quantity table to the adjusted skew quantity, and the process ends. The skew quantity within the skew quantity table may be updated only with respect to the magnetic head 12 having an apparatus performance greater than or equal to a predetermined apparatus performance or, with respect to all combinations of the magnetic heads 12 and the magnetic disks 11.

Figure 5:
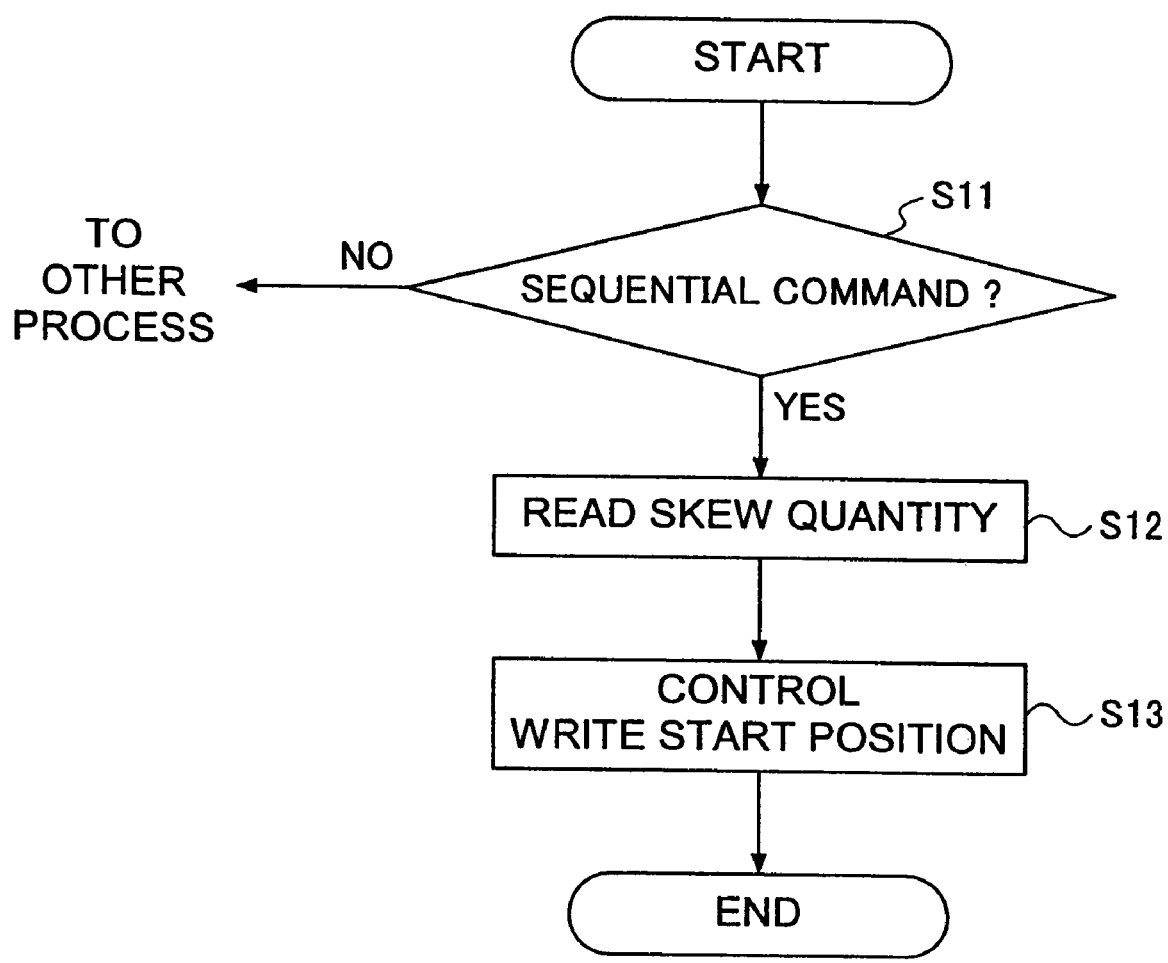
FIG. 5 is a flow chart for explaining a sequential access operation.

FIG. 5 is a flow chart for explaining a sequential access operation. The process shown in FIG. 5 is carried out by the MPU 15 in response to the write command from the host unit 1 shown in FIG. 1.

In FIG. 5, a step S11 decides whether or not the write command from the host unit 1 is a sequential access command. If the decision result in the step S11 is NO, the process advances to a next process such as judging whether or not the write command is a random access command. On the other hand, if the decision result in the step S11 is YES, a step S12 reads the skew quantity from the skew quantity table stored in the memory 16. If the skew quantity has been updated by the access performance adjustment as described above, the updated skew quantity is read from the skew quantity table stored in the memory 16. A step S13 carries out a known control to shift the data write starting position of each track depending on the head moving time that is required to move the magnetic head 12 from one track to another at the time of the sequential access, based on the skew quantity that is read from the skew quantity table stored in the memory 16, and the process ends.

Next, a description will be given of a second embodiment of the storage apparatus according to the present invention. This second embodiment of the storage apparatus employs a second embodiment of the access performance adjusting method according to the present invention. In this embodiment, the present invention is applied to the magnetic disk apparatus, and the basic structure of the magnetic disk apparatus is the same as that of the first embodiment shown in FIG. 1.

In this embodiment, the access performance adjustment is made with respect to the magnetic disk apparatus which uses a magnetic disk 11 having auxiliary tracks that are prepared to avoid defective tracks. A shift quantity of the data write starting position of one magnetic head 123 with respect to the defective tracks and the auxiliary tracks is stored as the shift quantity of the data write starting position of all magnetic heads 12 with respect to the cylinders corresponding to the defective tracks. Hence, the random access performance which accesses an arbitrary track can be made uniform among the magnetic disks 12 regardless of the number of defective tracks. Even in the case of the magnetic disk apparatus in which the recording density such as the BPI and the TPI is variably set, the cylinder width becomes the same when avoiding 1 track, for each magnetic head 12 and/or for each magnetic disk apparatus. Consequently, the difference in the physical positions of the cylinders among the magnetic heads 12 will not increase depending on the number of tracks which are avoided, and it is possible to make the random access performance uniform among the magnetic disk apparatuses having the same storage capacity.

Figure 6:
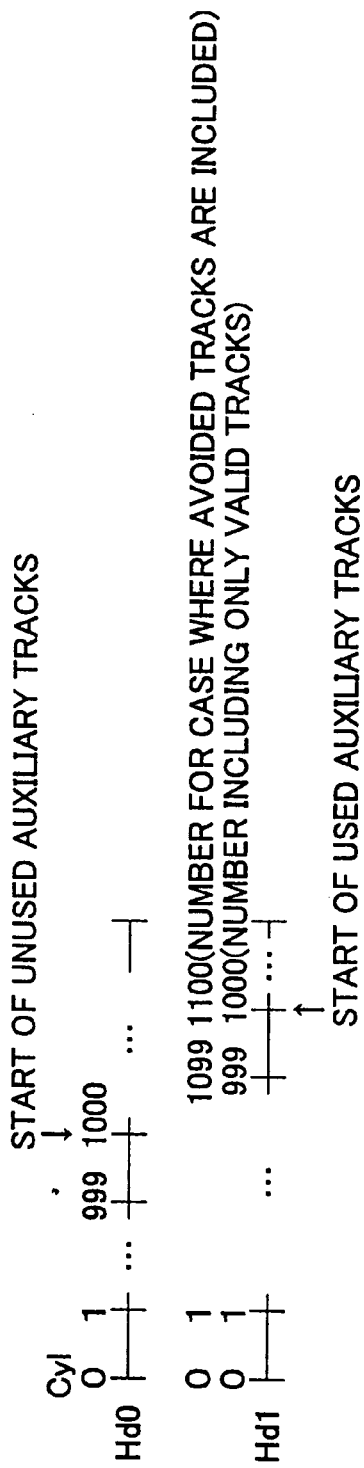
FIG. 6 is a diagram for explaining the operation of a second embodiment of the storage apparatus according to the present invention.

FIG. 6 is a diagram for explaining the operation of this embodiment. FIG. 6 shows the relationship of the magnetic heads 12 and the cylinders (or tracks) of the magnetic disks 11 in the magnetic disk apparatus which is a target of the access performance adjustment. In FIG. 6, "Cyl" indicates the cylinder number (number assigned to the cylinder), and Hd0 and Hd1 indicate head numbers assigned to the magnetic heads 12. In addition, in FIG. 6, the rightward direction corresponds to the inner peripheral direction of the magnetic disk 11, and the leftward direction corresponds to the outer peripheral direction of the magnetic disk 11. For the sake of convenience, it is assumed that the number of cylinders is 1000 and the number of auxiliary tracks is 500 with respect to each of the head numbers Hd0 and Hd1, and that the TPI is constant.

When the defect avoiding process is carried out, it is assumed that the number of cylinders (or tracks) subjected to the defect avoiding process is 0 for the head number Hd0, and the number of cylinders (or tracks) subjected to the defect avoiding process is 100 for the head number Hd1, as shown in FIG. 6. In this case, the physical position (or cylinder number) where a maximum user cylinder number "999" is arranged is Cyl=999 for the head number Hd0 but is Cyl=1099 for the head number Hd1. For this reason, in a case where the head number Hd0 starts to seek from the cylinder number Cyl=999 and the head number Hd1 seeks to the cylinder number Cyl=999, 100 cylinders must be sought in addition to switching the magnetic heads 12.

Figure 7:
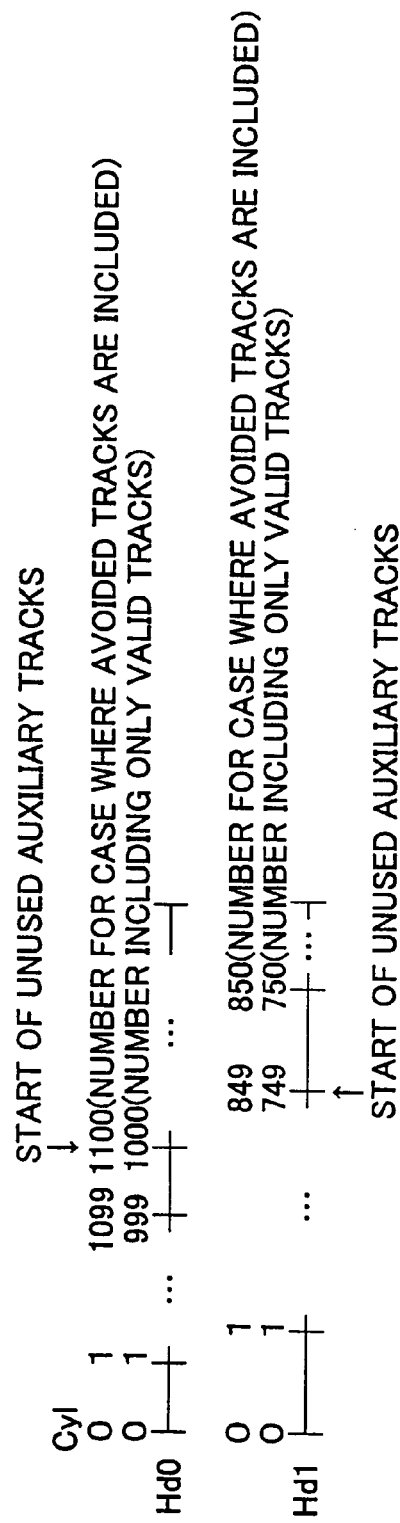
FIG. 7 is a diagram for explaining the operation of the second embodiment of the storage apparatus.

FIG. 7 is a diagram for explaining the operation of this embodiment. FIG. 7 shows the relationship of the magnetic heads 12 and the cylinders (or tracks) of the magnetic disk 11 in the magnetic disk apparatus. In FIG. 7, "Cyl" indicates the cylinder number (number assigned to the cylinder), and Hd0 and Hd1 indicate head numbers assigned to the magnetic heads 12. In addition, in FIG. 7, the rightward direction corresponds to the inner peripheral direction of the magnetic disk 11, and the leftward direction corresponds to the outer peripheral direction of the magnetic disk 11. For the sake of convenience, it is assumed that the number of cylinders is 1000 and the number of auxiliary tracks is 500 with respect to the head number Hd0, and the number of cylinders is 500 and the number of auxiliary tracks is 375 with respect to the head number Hd1. In other words, the TPI is not constant, and the cylinder width with respect to the head number Hd1 is ⅔ times the cylinder width with respect to the head number Hd0.

When carrying out the defect avoiding process, it is assumed that 100 cylinders (or tracks) are subjected to the defect avoiding process for the head number Hd0, and 100 cylinders (or tracks) are subjected to the defect avoiding process for the head number Hd1. In this case, if the TPI is not constant, the cylinder width when 1 cylinder (or track) is avoided also becomes different. In other words, even if the defect avoiding process is carried out with respect to the same position and/or the same number of cylinders (or tracks), the difference between the physical positions of the same cylinder for the magnetic heads 12 increases as the number of avoided tracks increases.

Hence, in this embodiment, the cylinder positions of the magnetic heads 12, that is, the head numbers Hd0 and Hd1, are confirmed at predetermined intervals. If the difference between the cylinder positions becomes greater than a tolerable value, additional avoiding tracks are inserted with respect to the magnetic head 12 which is located on the outer peripheral side of the magnetic disk 11 relative to the other magnetic head 12, so as to obtain additional avoiding information for use in correcting the difference between the cylinder positions of the magnetic heads 12. For example, in a case where the cylinder position is confirmed for each cylinder and the tolerable value of the difference between the cylinder positions of the magnetic heads 12 is 0, the additional avoiding information may include the following.

Additional Avoiding Information:
    Additional Avoiding Track number
    Hd0=990 to 999
    Hd1=0 to 4, 8 and 9

The memory 16 prestores the following track avoiding information in the form of the defect avoiding table.

Track Avoiding Information:
    Avoiding Track Number
    Hd0=0 to 9
    Hd1=5 to 7, and 990 to 999

The track avoiding information within the defect avoiding table is updated using the additional avoiding information, and becomes as follows.

Track Avoiding Information:
    Avoiding Track Number
    Hd0=0 to 9, and 990 to 999
    Hd1=0 to 4, 5 to 7, 8, 9, and 990 to 999

Hence, it is possible to eliminate the difference between the cylinder positions of the magnetic heads 12, and to make the random access performance uniform among the magnetic heads 12. It is also possible to cope with a magnetic disk apparatus in which the cylinder width differs depending on the magnetic head 12, by taking into consideration the cylinder width when calculating the cylinder position. Moreover, the auxiliary tracks on the magnetic disk 11 include the auxiliary tracks for defect avoidance and the auxiliary tracks for access performance adjustment.

By correcting the difference between the cylinder positions of the magnetic heads 12 among the individual magnetic disk apparatuses, it is possible to make the random access performance uniform among these individual magnetic disk apparatuses.

Figure 8:
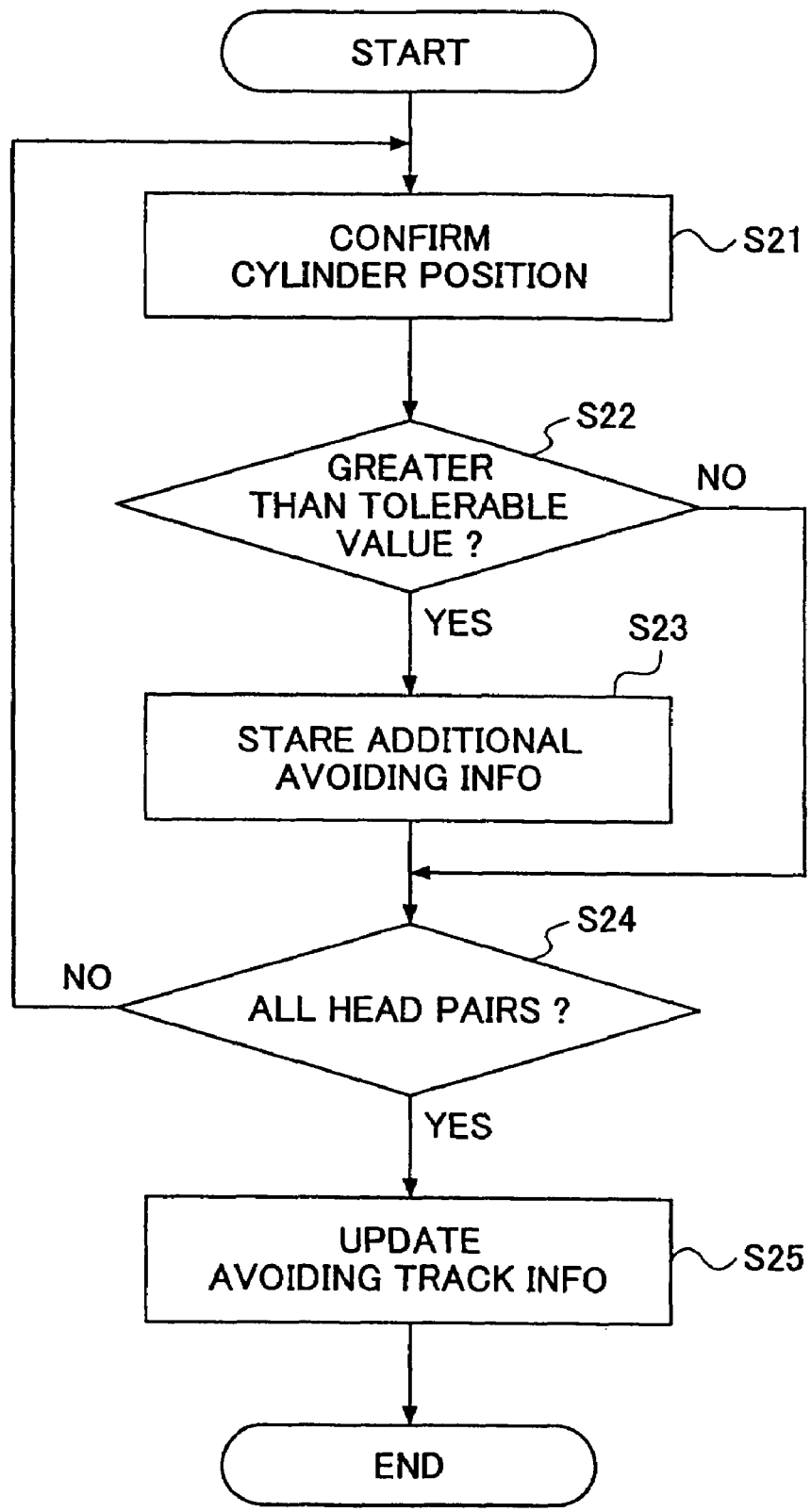
FIG. 8 is a flow chart for explaining the operation of the second embodiment of the storage apparatus.

FIG. 8 is a flow chart for explaining the operation of this embodiment. The process shown in FIG. 8 is carried out by the host unit 1 shown in FIG. 1 when shipping the magnetic disk apparatus.

In FIG. 8, a step S21 confirms the cylinder positions of a pair of magnetic heads 12 at predetermined intervals. A step S22 decides whether or not the difference between the cylinder positions of the pair of magnetic heads 12 is greater than a tolerable value. The process advances to a step S24 which will be described later, if the decision result in the step S22 is NO. On the other hand, if the decision result in the step S22 is YES, a step S23 inserts the additional avoiding tracks with respect to the magnetic head 12 which is located on the outer peripheral side of the magnetic disk 11 relative to the other magnetic head of the pair, so as to obtain and store in the memory 16 the additional avoiding information for correcting the difference between the cylinder position of the pair of magnetic heads 12. The step S24 decides whether or not the steps S21 through S23 are carried out with respect to all pairs of magnetic heads 12 within the magnetic disk apparatus, and the process returns to the step S21 if the decision result in the step S24 is NO. If the decision result in the step S24 is YES, a step S25 updates the avoiding track information within the defect avoiding table stored in the memory 16 using the additional avoiding information stored in the memory 16, and the process ends.

FIG. 9 is a flow chart for explaining a random access operation. The process shown in FIG. 9 is carried out by the MPU 15 in response to the write command from the host unit 1 shown in FIG. 1.

In FIG. 9, a step S31 decides whether or not the write command from the host unit 1 is a random access command. If the decision result in the step S31 is NO, the process advances to a next process, such as judging whether or not the write command is a sequential access command. On the other hand, if the decision result in the step S31 is YES, a step S32 reads the avoiding track information from the defect avoiding table stored in the memory 16. If the avoiding track information has been updated by the access performance adjustment as described above, the updated avoiding track information is read from the defect avoiding table stored in the memory 16. A step S33 carries out a known control to avoid moving the magnetic head 12 to the defective tracks during the random access, based on the avoiding track information that is read from the defect avoiding table stored in the memory 16, and the process ends.

This application claims the benefit of a Japanese Patent Application No. 2004-051971 filed Feb. 26, 2004, in the Japanese Patent Office, the disclosure of which is hereby incorporated by reference.

Further, the present invention is not limited to these embodiments, but various variations and modifications may be made without departing from the scope of the present invention.

What is claimed is:

1. An access performance adjusting method for a storage apparatus having a recording medium with auxiliary tracks for avoiding defective tracks, comprising the steps of:

obtaining additional avoiding information for correcting a difference between cylinder positions of heads by inserting additional avoiding tracks with respect to a head located on an opposite side from the auxiliary tracks on the recording medium if the difference between the cylinder positions of the heads is greater than a tolerable value at predetermined intervals; and updating avoiding track information for accessing the auxiliary track by avoiding the defective tracks, stored in a storage, by use of the additional avoiding information.

2. An access performance adjusting method comprising the steps of:

preparing at least one recording medium having auxiliary tracks for avoiding defective tracks; and storing a shift quantity between data write starting positions of one head with respect to the defective tracks and the auxiliary tracks, as a shift quantity between data write starting positions of all heads with respect to cylinders corresponding to the defective tracks, so as to make a random access performance uniform among heads.

3. A storage apparatus comprising:

at least one recording medium having auxiliary tracks for avoiding defective tracks;

an obtaining part configured to obtain additional avoiding information for correcting a difference between cylinder positions of heads by inserting additional avoiding tracks with respect to a head located on an opposite side from the auxiliary tracks on the recording medium if the difference between the cylinder positions of the heads is greater than a tolerable value at predetermined intervals;

a storage configured to store avoiding track information for accessing the auxiliary track by avoiding the defective tracks; and an updating part configured to update the avoiding track information stored in a storage, by use of the additional avoiding information.

4. A storage apparatus comprising:

at least one recording medium having auxiliary tracks for avoiding defective tracks; and a storage configured to store a shift quantity between data write starting positions of one head with respect to the defective tracks and the auxiliary tracks, as a shift quantity between data write starting positions of all heads with respect to cylinders corresponding to the defective tracks, so as to make a random access performance uniform among heads.

* * * * *